(12) United States Patent
Borel

(10) Patent No.: US 6,350,061 B1
(45) Date of Patent: Feb. 26, 2002

(54) SYSTEM FOR FIXING AND GUIDING A BEARING ON A FRAME

(75) Inventor: Edouard Borel, Dommartin (CH)

(73) Assignee: Bobst S.A. (CH)

( * ) Notice: Subject to any disclaimer, the term of this patent is extended or adjusted under 35 U.S.C. 154(b) by 0 days.

(21) Appl. No.: 09/544,648

(22) Filed: Apr. 6, 2000

(30) Foreign Application Priority Data

Apr. 28, 1999 (CH) .............................................. 0782/99

(51) Int. Cl.[7] ............................ F16C 23/00; F16C 13/00
(52) U.S. Cl. ........................ 384/215; 384/247; 384/256
(58) Field of Search ................................. 384/215, 247, 384/252, 256, 258, 428, 441, 519, 535, 581; 100/168

(56) References Cited

U.S. PATENT DOCUMENTS

| | | | | |
|---|---|---|---|---|
| 3,394,971 A | * | 7/1968 | Bazeley ...................... | 384/535 |
| 4,905,598 A | * | 3/1990 | Thomas et al. ......... | 384/256 X |
| 5,098,000 A | * | 3/1992 | Rumpf et al. ........... | 384/247 X |
| 5,612,583 A | * | 3/1997 | Crucq et al. ............ | 384/535 X |

FOREIGN PATENT DOCUMENTS

JP 6-33938 A * 2/1994 ................. 384/535

* cited by examiner

Primary Examiner—Thomas R. Hannon
(74) Attorney, Agent, or Firm—Ostrolenk, Faber, Gerb & Soffen, LLP

(57) ABSTRACT

This system for fixing and guiding a bearing (3) in a slot (5) in a frame (8) comprises elongate flat fixing members (14) extending straddle-fashion between the coplanar respective end faces of the respective uprights (6, 7) of the frame and of the said bearing (3). Extending through each of said fixing members (14) are three cut-outs, one of which is in the form of an elongate closed opening and the other two in the form of slots open at one of their ends, disposed at the respective two ends of the said elongate opening. A strip perpendicular to the said uprights (6, 7) is formed between said elongate opening and each of said open slots adapted to form in the said fixing member (14) two fixing lugs disposed on either side of said slot, one lug being fixed to the upright (6; 7) and the other to the said bearing (3).

7 Claims, 2 Drawing Sheets

SYSTEM FOR FIXING AND GUIDING A BEARING ON A FRAME

BACKGROUND OF THE INVENTION

1. Field of the Invention

This invention relates to a system for fixing and guiding a bearing on a frame comprising two parallel uprights, a slot formed between them to receive the bearing and fixing members between the uprights and the bearing disposed straddle-fashion between the coplanar end faces of the respective uprights and of the bearing.

2. Description of Related Art

These bearings are used particularly for pivoting the cutting cylinders of rotary cutters in machines for making folding packing boxes from cardboard in strip form. These bearings are subjected to severe vibration conditions and abrupt dynamic force variations, so they have to be tightened and prestressed along three axes to guarantee optimal anti-vibration behavior.

Bearings of this kind should have only a single degree of freedom, the one defined by the slot for guiding the two parallel side surfaces of the bearing in engagement therewith, so that if the pressure exerted on the bearing exceeds a certain threshold in quite exceptional circumstances, the bearing can move only in that direction, thus enabling the spacing between the working cylinders to be increased.

It is therefore necessary to be able to move the upper cylinder away from the lower cylinder by a few tenths of a millimetre to release the shims, while guaranteeing replacement after exchange of the shims with an accuracy in accordance with the above-mentioned requirements and with minimum effort.

In the event of an accident, which is generally caused by cardboard jamming between the cutting cylinders, the bearings of the upper cylinder must be capable of moving along the slot in which they are guided in order to preserve the bearings and the cutting cylinders.

To this end, the bearing is immobilised in the slot by a pressure screw screwed into a yoke fixed to the top of the two uprights between which the bearing guide slot is formed. This yoke, which also serves to apply the uprights against the side surfaces of the bearing, is screwed to the ends of said uprights by calibrated screws which can elongate by creep or break beyond a specific pressure exerted on the bearing, said screws thus playing the same role as a fuse in an electrical circuit.

Fixing of the bearing of the lower cylinder is obtained by means of flat rectangular members disposed straddle-fashion along the two edges of the guide slot and screwed at its four corners to the bearing and to the adjacent upright. Such fixing gives no degree of freedom, so that it cannot be used for fixing the bearings of the upper cylinder if it is required to take advantage of the security mentioned above in the event of jamming. Also, such fixing does not enable the thickness of the shims to be changed.

Since cutting can be effected only for a spacing of micrometer precision between the cylinders and the spacing must be capable of adjustment periodically to allow for the wear of the cutting tools and specific operating conditions, the bearings of the two cylinders are separated by shims of variable thickness.

Consequently, the problem arising in fixing the bearings of the upper cylinder is complex and at present forms the subject matter of solutions using complex and complicated guide systems which give rise to problems associated with the dust and high pressures that they have to withstand.

The object of this invention is to at least partly obviate the above disadvantages.

BRIEF SUMMARY OF THE INVENTION

To this end, the invention relates to a system for fixing and guiding a bearing on a frame.

The fixing member is a simple part to manufacture requiring no great precision except for its abutment surface which simply has to be planed to guarantee its contact with the end surfaces of the bearing and of the adjacent upright.

This fixing means enables the bearing to be given just a single degree of freedom in the direction of the slot. This degree of freedom serves to enable the bearing to be moved upwards a few tenths of a millimetre on the changing of the shims and this slight movement tends to move the uprights apart and hence reduce their pressure on the bearings, thus facilitating its release.

In the event of a greater displacement of the bearing, for example following a jam, the suspension strips initially tend to move the bearing uprights apart, and then they buckle with creep together with the fixing screws of the yoke connecting the top ends of the two uprights. This displacement is preferably limited by the spacing of the slots separating the fixing lugs.

The fixing member according to the invention can be screwed in place without any specific precaution after accurate positioning of the bearing in the slot and tightening of the yoke. Consequently, any displacement of the bearing within the limits of elastic deformation of the suspension strips enables the bearing to be extremely faithfully and easily replaced in position after the shims have been exchanged, since the elastically deformed suspension strips normally resume their initial shape, applying the bearing against the new shims.

Another advantage of the fixing system according to the invention is the maximum horizontal rigidity imparted to the bearing in comparison with any other known means. Thus if it is required to interpose needle elements between the slot and the bearing, the rigidity would be greatly reduced as a result.

BRIEF DESCRIPTION OF THE DRAWINGS

The accompanying drawing diagrammatically illustrates by way of example one embodiment of the system for fixing a bearing according to the present invention.

DETAILED DESCRIPTION OF THE INVENTION

Figure 1:
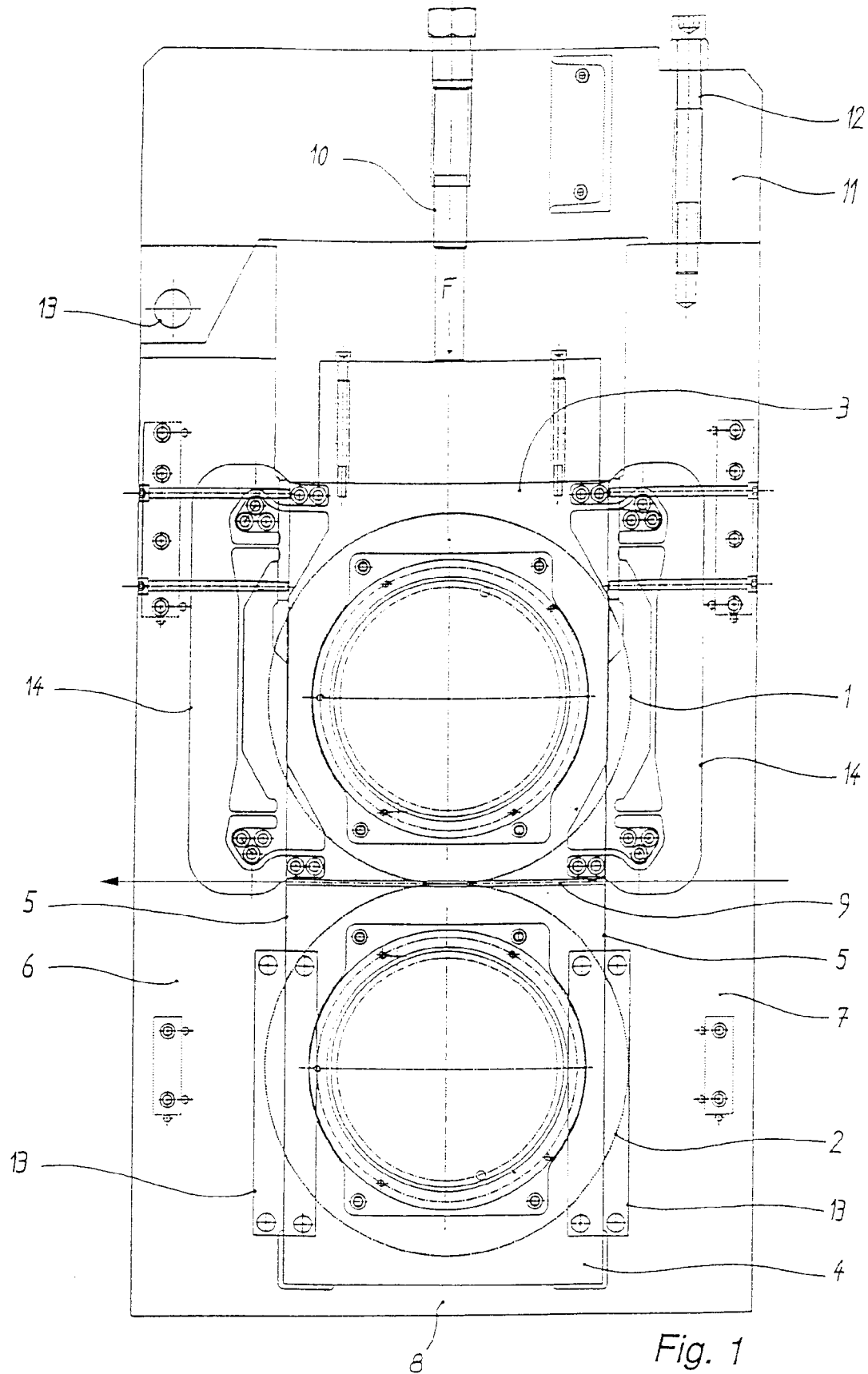
FIG. 1 is an elevation of the outer side face of a module for pivoting the two working cylinders of a rotary cutter for folding boxes.

The module for pivoting two cylinders for cutting cardboard in strip form, as illustrated in FIG. 1, shows a typical application for which the fixing system according to this invention has been designed.

This module comprises two superposed cylinders 1, 2 mounted at their respective two ends in bearings 3, 4, only two of these bearings, situated at one of the respective ends of said cylinders 1, 2, being visible in the drawing. Said bearings 3, 4 have a rectangular external shape, two parallel sides of which are engaged in a slot 5 formed between the inner edges of two parallel uprights 6, 7 of a frame 8.

The spacing between said two bearings 3, 4 is controlled with micrometre precision by means of shims 9, intended to define the relative positions of the two cylinders 1, 2 and hence the degree of penetration of the cutting or scoring tools in the strip of cardboard passing between them.

Said two bearings 3, 4 are held in the slot 5 by a screw 10 which exerts a pressure F on a transverse surface of the top bearing 3. Said screw 10 is screwed in a yoke 11, which is itself fixed at the ends of the uprights 6 and 7 by a screw 12 and an articulation shaft 13 or by two screws screwed at the two ends of the respective uprights 6, 7. The screw 12 is calibrated to withstand a critical traction force selected in dependence on the maximum admissible pressure exerted on the bearing 3 in the opposite direction to the force F, so as to deform non-elastically or break beyond this limit.

Certain known means (not shown since they do not directly form part of this invention) will enable part of the force F exerted by the screw 10 to be converted into forces tending to bring the uprights 6, 7 together in order to apply the edges of the slot 5 against the bearings 3, 4.

Two fixing members 14 are disposed along the two edges of the slot 5 and straddle the end surfaces of the bearing 3 and of the respective adjacent uprights 6, 7.

Figure 2:
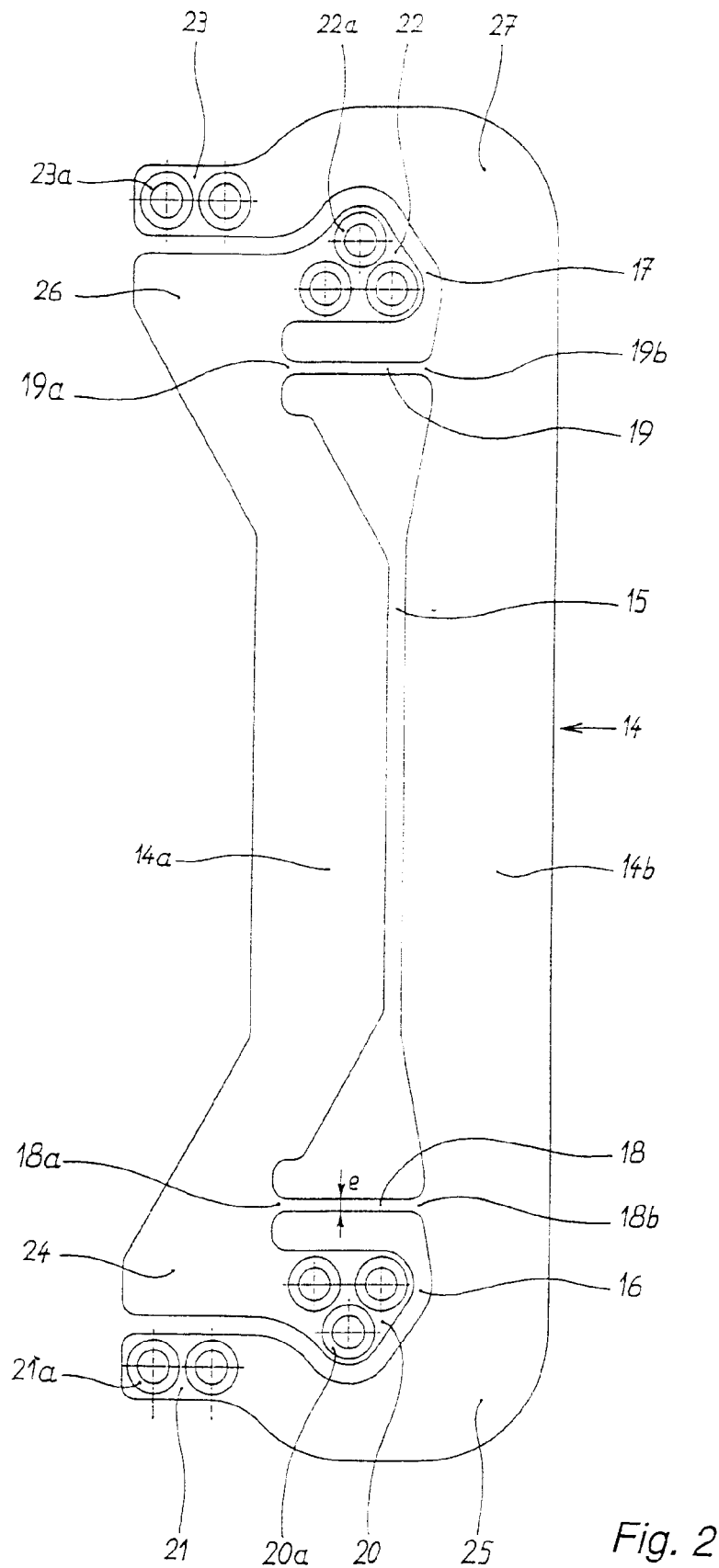
FIG. 2 is a partial enlarged view of FIG. 1.

FIG. 2 shows one of said fixing members 14 to an enlarged scale. Said member 14 is formed from a relatively thick elongate steel plate so as to form abutment elements to prevent movement of the bearing 3 with respect to the frame 8 along the axis of rotation of the cylinder 1 as explained hereinafter.

Extending through the fixing member 14 is an elongate closed opening 15 which widens out at its two ends.

Said elongate opening 15 longitudinally divides the fixing member 14 into two parts, an.,inner part 14a situated adjacent the bearing 3 and an outer part 14b situated on the opposite side. Also extending through the member 14 are two other openings 16, 17 formed by slots open at one of their ends. The shape of said slots 16, 17 is selected so as to form, on the one hand, with each end of the closed opening 15, a suspension strip 18, 19 oriented perpendicularly to the slot 5 and, on the other hand, two fixing lugs 20, 21; 22, 23 respectively on either side of each slot 16, 17. Said fixing lugs 20–23 each have a number of holes 20a–23a intended to receive fixing screws (not shown).

Lug 20 is connected by an arm 24 to one of the ends 18a of the suspension strip 18 while the lug 21 is connected by an arm 25 to the other end 18b of the same strip 18. The lug 22 is symmetrically connected by an arm 26 to one of the ends 19a of the suspension strip 19 while the lug 23 is connected by an arm 27 to the other end 19b of said strip 19.

As shown in FIG. 2, the lugs 20 and 22 and their respective connecting arms 24, 26 are secured to the inner part 14a of the fixing member 14 but they are fixed in the upright 7 which is on the outside with respect to the bearing 3. On the other hand, the lugs 21 and 23 and their respective arms 25 and 27 are secured to the outer part 14b of the fixing member 14 but are fixed in the bearing 3 which is inside the uprights 6 and 7.

Consequently, the four connecting arms 24–27 each straddle the end surfaces of the upright 7 and of the bearing 3. As a result, the two arms 25 and 27 prevent any axial displacement of the bearing 3 extending towards the interior of the frame 8, the outer surface of which will be seen in FIGS. 1 and 2, while the arms 24 and 26 prevent any axial movement of said bearing 3 directed towards the exterior of said frame 8.

The suspension strips 18 and 19 for their part prevent any movement of the bearing perpendicularly to the slot 5 in one direction or the other. Thus said fixing member 14 leaves the bearing 3 only a single degree of freedom in the vertical direction. The thickness of the fixing member is very substantially greater than the thickness e of the suspension strips 18 and 19. By way of example, the fixing member may typically have between 10 and 50 mm thickness. The ratio between the length and thickness e of the strips 18, 19 is typically from 1 to 10 and depends on the magnitude of the elastic flexure required. This thickness may vary approximately from 0.5 mm to 8 mm.

Since the screws used to fix the fixing lugs 20–23 do not allow an accurate positioning, their fixing will be effected after the tightening of the screws 10 and 12 once the bearing 3 is perfectly positioned against the shims 9. Tightening of the screw 12 which fixes the yoke 11 and of the screw 10 which tightens the bearing 3 in the slot 5 enables the position of the bearing 3 to be controlled accurately while ensuring perfect contact against the shims 9. Once this position has been defined in this way, the screws of the fixing lugs 20–23 are tightened so that the respective tightening positions of the fixing lugs 20–23 correspond to the reference position of the bearing 3.

Consequently, if the shims 9 have to be changed due to wear of the cutting tools of the cylinders 1, 2 for example, all that is necessary is to release the screws 10. The bearing 3 can then be lifted in the slot 5 a few tenths of a millimetre within the limit of the elastic deformation of the strips 18 and 19. During this raising, if we consider the strip 18, the end 18b pivots about a point corresponding to the end 18a. This pivoting is accompanied by a very small spacing of the uprights 6 and 7. In view of the symmetrical position of the lugs 20, 21 with respect to the lugs 22, 23, the trajectory of the bearing 3 during this movement is vertical, i.e. it follows the slot 5.

After the shims 9 have been replaced depending on the new spacing required between the cylinders 1 and 2, the strips 18, 19 return, or tend to return, to their initial reference position. If the new shims are thicker than those that have been replaced, the strips 18, 19 will retain a very slight elastic deformation. If, on the contrary, the new shims are thinner to allow for the wear or specific working conditions, the strips 18, 19 are forced slightly downwards by the weight of the tool 1 until the bearing 3 is in contact with the new shims 9. A supplementary fine movement occurs on the tightening of the screw 10. Obviously these differences in the thickness of the shims 9 are at most of the order of a few hundredths of a millimetre, so that they do not affect the geometry of the whole.

In the event of any malfunction likely to produce a greater displacement of the bearing 3, the strips 18, 19 will first pivot as previously while tending to move the uprights 6 and 7 of the bearing 3 apart, and then they will buckle with creep. The stroke will be limited by the spacing of the portion of the slots 16 and 17 which extends transversely to the slot 5 in which the bearing 3 is guided. Simultaneously, one or more of time screws 12 will elongate or break. These screws 12 and the fixing member 14 will then have to be changed, but the vital parts, i.e. the bearings 3, 4 and the cylinders 1, 2 will have been saved.

What is claimed is:

1. A system for fixing and guiding a bearing comprising:
   a frame formed of two parallel uprights spaced to define a slot that receives a bearing;
   first and second fixing members respectively positioned on coplanar end faces of the uprights, each fixing member including a portion which extends across the slot between the uprights, thereby to straddle the coplanar end faces of the respective uprights and of the bearing, each fixing member including:
- a first cut-out that forms a closed opening elongated in a direction of elongation of the slot between the uprights;
- second and third cut-outs, each open at one end, and disposed at opposite ends of the closed opening,
- the first, second and third cut-outs separating the fixing member into a first part disposed inwardly relative to the slot between the uprights, and a second part disposed outwardly of the first part relative to the slot between the uprights,
- two suspension and positioning strips substantially perpendicular to the uprights that separate the elongated opening defined by the first cut-out from the second and third cut-outs;
- first and second pairs of fixing lugs respectively located at opposite ends of the fixing member,
  - each pair of fixing lugs being disposed on opposite sides of one of the second and third cut-outs,
  - one fixing lug of each pair of fixing lugs being attachment to the upright which is adjacent to the fixing member, and
  - and the other fixing member of each pair of fixing lugs being attached to the bearing,
  - the first and second parts of the fixing members being isotropically rigid to ensure the position of the fixing member with respect to attachment points of the fixing lugs on the uprights;
  - one lug of each pair of lugs being respectively connected to opposite ends of one of the suspension and positioning strips by an arm which is rigid with respect to the suspension and positioning strip.

2. A system according to claim 1, wherein the fixing lugs attached to the uprights are connected to the ends of the respective suspension and positioning strips closest to the bearing and the fixing lugs attached to the bearing are connected to the ends of the respective suspension and positioning strips furthest away from the bearing.

3. A system according claim 1, wherein the thickness of the fixing member is substantially greater than the thickness of the suspension and positioning strips.

4. A system according to claim 1, wherein the ratio of the length and thickness of the suspension and positioning strips is of the order of 1 to 10.

5. A system according to claim 1, wherein:
- the first and second parts of the fixing member respectively terminate in the arms that connect the respective fixing lugs to the respective suspension and positioning strips,
- the connecting arms that terminate the outer parts of the fixing members extend inwardly, and
- the connecting arms that terminate the inner parts of the fixing members extend outwardly and are disposed between the connecting arms of the outer parts and the respective suspension and positioning strips.

6. A system according to claim 1, wherein:
- the connecting arms extending from the fixing lugs attached to the uprights overlie adjacent portions of the end face of the bearing; and
- the connecting arms extending from the fixing lugs attached to the uprights overlie adjacent portions of the end face of the uprights,
- whereby to oppose movement of the bearing along an axis of rotation thereof.

7. A system according to claim 1, wherein at least one portion of each of the second and third cut-outs extends in a direction transverse to the slot between the uprights so that the spacing of the transverse portion of the second and third cut-outs limits the amplitude of travel that can be covered by the bearing.

* * * * *